3,367,794
ALUMINUM DEPOSITION PROCESS
Jimmy D. Burnett, Lacey Springs, Ala., assignor to the United States of America as represented by the Secretary of the Army
No Drawing. Filed Jan. 2, 1964, Ser. No. 335,439
2 Claims. (Cl. 117—107.2)

This invention relates to a method for producing aluminum vapors and particularly to a method for decomposing powdered aluminum hydride to produce aluminum vapors.

It is known that powdered aluminum hydride will decompose into aluminum and hydrogen when heated for prolonged periods at temperatures greater than 100° C. however, the aluminum evolved during heating accumulates as a drak gray powder.

It has now been determined that if powdered aluminum hydride is heated to its decomposition point in the presence of certain amines, the aluminum evolves in the form of a vapor which deposits on suitable surfaces to produce a thin bright metal coating of aluminum. This method of decomposing aluminum hydride affords a means for coating the surfaces metal and ceramic bodies with thin layers of aluminum. For example, ordinary glass coated with aluminum according to the present process makes a very satisfactory mirror. Iron objects can be coated in this manner to deter oxidation. The process is suited best for coating small objects.

The amines which can be used in the present process are the secondary amines of the formula

wherein R and R' are each lower alkyl groups of up to six carbon atoms. Di-n-butyl-amine is the preferred member of the group because of its availability and the good results achieved with it in coating glass with aluminum.

In using the method of the present invention, the aluminum hydride and amine are mixed together in a molar ratio of hydride to amine of about 1.0:1.0 to about 1.0:3.0 and thereafter heated to the decomposition temperature. The vapor evolved should be brought into contact with the surface to be coated as soon as decomposition occurs. Small objects can be coated simply by suspending them immediately above the amine-aluminum hydride mixture being being decomposed. Large objects may require the use of pumps or other means to bring the vapors into contact with the surface to be coated. The use of a partial vacuum and/or an inert atmosphere such as argon is also helpful in acquiring uniform coatings.

For best results, the aluminum hydride-amine mixture should be heated at a uniform rate up to the decomposition temperature of the hydride. Heating at a rate which gives an increase in temperature of about 9° C. to about 13° C. per minute gives the best results. The specific decomposition temperature of aluminum hydride varies with the rate at which it is heated. When heated at a constant rate of 11° C. per minute the decomposition temperature is about 168.8° C. A lower rate of temperature increase gives a lower decomposition temperature while a higher rate gives a higher decomposition temperature.

The following example illustrates the method of the invention:

A powdered aluminum hydride-amine mixture made up of 0.2 cc. of di-n-butylamine and .03 g. of aluminum hydride (Olane 58 produced by Olin Mathieson Chemical Corp.) was placed in the bottom of a small glass container. The mixture was heated from room temperature to about 170° C. at a rate of 11° C. per minute. The aluminum which was evolved deposited on one surface of a small glass object located immediately above the mixture. The coating reflected light through the glass and produced clear, sharp images in the same manner as silver coated glass mirrors.

Using the same procedure as above, any of the aforementioned amines can be substituted for the n-butylamine with substantially identical results.

The above description is for purposes of illustration only and no undue limitation of the invention should be attributed to the invention as a result thereof except as reflected in the appended claims.

I claim:

1. The method of coating a substrate with aluminum by decomposing powdered aluminum hydride to produce aluminum vapors, said method comprising the steps of: heating a mixture of powdered aluminum hydride and at least one amine to the decomposition point of said hydride, said amine being selected from the group consisting of secondary amines of the formula

wherein R and R' are each lower alkyls of up to 6 carbon atoms, and depositing said aluminum vapors on the substrate to be coated.

2. The method according to claim 1 wherein said amine is di-n-butylamine.

References Cited

UNITED STATES PATENTS 2,804,397   8/1957   Goodman.

OTHER REFERENCES

NBS–6645, A.E.C. document, published Apr. 1, 1960, "Preliminary Report on the Thermodynamic Properties of Selected Light Element Compounds," pp. 1–10 (abstracted in Nuclear Science Abstracts, vol. 14, No. 21, page 2768, November 1960).

ALFRED L. LEAVITT, *Primary Examiner.*

L. DEWAYNE RUTLEDGE, REUBEN EPSTEIN,
*Examiners.*

M. DINNIN, *Assistant Examiner.*